United States Patent
Takano

(10) Patent No.: US 9,425,868 B2
(45) Date of Patent: Aug. 23, 2016

(54) BASE STATION, COMMUNICATION SYSTEM AND COMMUNICATION METHOD

(75) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 531 days.

(21) Appl. No.: 13/579,165

(22) PCT Filed: Jan. 25, 2011

(86) PCT No.: PCT/JP2011/051306
§ 371 (c)(1),
(2), (4) Date: Aug. 15, 2012

(87) PCT Pub. No.: WO2011/122083
PCT Pub. Date: Oct. 6, 2011

(65) Prior Publication Data
US 2012/0302281 A1 Nov. 29, 2012

(30) Foreign Application Priority Data

Mar. 31, 2010 (JP) ................. P2010-082050

(51) Int. Cl.
| | |
|---|---|
| *H04B 5/00* | (2006.01) |
| *H04B 7/02* | (2006.01) |
| *H04L 5/00* | (2006.01) |
| *H04B 17/14* | (2015.01) |
| *H04B 17/21* | (2015.01) |
| *H04L 25/02* | (2006.01) |
| *H04W 72/04* | (2009.01) |

(52) U.S. Cl.
CPC ............... *H04B 7/024* (2013.01); *H04B 17/14* (2015.01); *H04B 17/21* (2015.01); *H04L 5/0023* (2013.01); *H04L 5/0035* (2013.01); *H04L 5/0073* (2013.01); *H04L 25/0204* (2013.01); *H04W 72/0426* (2013.01)

(58) Field of Classification Search
CPC ...................................... H04B 7/024
USPC ............... 455/41.1, 82, 524; 375/260
See application file for complete search history.

(56) References Cited

U.S. PATENT DOCUMENTS

| | | |
|---|---|---|
| 2007/0117559 A1 | 5/2007 | Trivedi et al. |
| 2009/0196365 A1 | 8/2009 | Takano |
| 2010/0067588 A1 | 3/2010 | Takano |

FOREIGN PATENT DOCUMENTS

| | | |
|---|---|---|
| JP | 2007-116489 A | 5/2007 |
| JP | 2009-188546 A | 8/2009 |

OTHER PUBLICATIONS

U.S. Appl. No. 13/580,171, filed Aug. 21, 2012, Takano.
International Search Report issued Mar. 1, 2011 in PCT/JP2011/051306.

(Continued)

*Primary Examiner* — Hsin-Chun Liao
(74) *Attorney, Agent, or Firm* — Chip Law Group

(57) ABSTRACT

Provided is a base station including a plurality of branches, a storage unit that stores a calibration coefficient of each of the plurality of branches for each combination of other base stations, and a multiplying unit that multiplies a transmission signal from each of the plurality of branches by a calibration coefficient corresponding to a combination of one or more other base stations when CoMP transmission with the one or more other base stations is performed through the plurality of branches.

7 Claims, 10 Drawing Sheets

(56) References Cited

OTHER PUBLICATIONS

"Antenna Array Calibration for TDD CoMP", Alcatel-Lucent Shanghai Bell, Alcatel-Lucent, 3GPP TSG RAN WG1 Meeting #59bis, R1-100427, Jan. 18-22, 2010, 5 pages.
"Evaluation of DL CoMP Gain Considering RS Overhead for LTE-Advanced", NTT DOCOMO, 3GPP TSG RAN WG1 Meeting #56bis, R1-091484, Mar. 23-27, 2009, 8 pages.
"On the Aantenna Calibration in TDD CoMP", TD Tech, 3GPP TSG RAN WG1 meeting #60, R1-101016, Feb. 22-26, 2010, 5 pages.
"Antenna calibrations for TDD CoMP", Samsung, 3GPP TSG RAN WG1 #60, R1-101177, Feb. 22-26, 2010, 3 pages.
Office Action issued Dec. 10, 2013 in Japanese Patent Application No. 2010-082050.
Chinese Office Action issued Sep. 10, 2014, in China Patent Application No. 201180015987.9 (with English translation).
European Search Report Received for EP Patent Application No. 11762324.9, Mailed on Dec. 21, 2015.

BASE STATION, COMMUNICATION SYSTEM AND COMMUNICATION METHOD

TECHNICAL FIELD

The present invention relates to a base station, a communication system, and a communication method.

BACKGROUND ART

Recently, introduction of a $4^{th}$ generation cellular system (4G) has been under discussion in order to achieve improvement of additional performance of wireless communication. In 4G, techniques such as a relay technique, a carrier aggregation, and a coordinated multiple point transmission and reception (CoMP) are attracting attention.

The relay technique refers to a technique by which a relay node relays communication between a base station (for example, a macro cell base station) and a communication terminal, and the relay technique is important in improving the throughput at a cell edge of a base station. The carrier aggregation is a technique in which a use bandwidth is increased and a maximum throughput is improved by collectively treating a plurality of frequency bands each having a bandwidth of 20 MHz. CoMP is a technique by which a plurality of base stations collaborate with each other to perform data communication with a communication terminal, and the coverage of high-data-rate communication can be increased.

In further detail, CoMP refers to a technique by which a plurality of base stations simultaneously perform data communication with one communication terminal. According to this technique, since branches of a plurality of base stations can be used for data communication, an antenna gain and a signal to interference plus noise ratio (SINR) can be improved.

Here, it is assumed that a base station has calculated a weight of a branch based on a channel matrix of an uplink from a communication terminal and then has obtained reception directivity. In this case, when a weight of a branch is used even at the time of transmission, transmission directivity matching reception directivity is considered to be obtained. However, since a transfer function of a transmission analog unit and a transfer function of a reception analog unit of each branch are different from each other, actual transmission directivity does not match reception directivity.

Problems caused due to the difference between the transfer function of the transmission analog unit and the transfer function of the reception analog unit of each branch are solved such that each base station individually performs branch calibration and a calibration coefficient of each branch. The calibration coefficient is a coefficient used to regularize a ratio of the transfer function of the transmission analog unit and the transfer function of the reception analog unit of each branch in one base station. The branch calibration is disclosed in, for example, Patent Literature 1.

CITATION LIST

Patent Literature

Patent Literature 1: JP 2009-188546A
Patent Literature 2: JP 2007-116489A

SUMMARY OF INVENTION

Technical Problem

However, in the above-described individual branch calibration, it is possible to obtain the calibration coefficient used to regularize the ratio of the transfer function of the transmission analog unit and the transfer function of the reception analog unit of each branch in one base station, but it is difficult to regularize the ratios of the transfer function of the transmission analog unit and the transfer function of the reception analog unit of all branches in a plurality of base stations. For this reason, using only a method in which each base station individually performs branch calibration, it is difficult to treat all branches in a plurality of base stations performing CoMP equivalently to a plurality of branches in one device in which branch calibration has been completed. In other words, when CoMP is performed using branches of a plurality of base stations in an aggregate manner, it is difficult to match uplink directivity with downlink directivity.

Further, when each base station individually performs branch calibration, each base station individually forms directivity and performs a CoMP, but efficient communication is expected to be difficult to perform. For example, when three base stations having two branches individually perform branch calibration, it is possible to implement MIMO communication of 2×N of 3 sets (N is the number of branches at a communication terminal side), but it is difficult to implement MIMO communication of 6×N of a higher throughput.

For this reason, it is desirable to perform unified branch calibration through all branches in a plurality of base stations performing CoMP and cause all branches in a plurality of base stations to be treated equivalently to a plurality of branches in one device.

Here, a combination of other base stations with which a certain base station performs CoMP transmission together is considered to differ according to the position or a communication environment of a communication terminal of a reception destination. For example, when a first base station performs CoMP transmission with a second base station, the first base station may perform CoMP transmission with a third base station.

In this regard, when a base station performs unified branch calibration in collaboration with all other base stations which can perform CoMP transmission together, the base station can acquire a primarily usable calibration coefficient regardless of a combination of other base stations. For example, when a base station simultaneously performs branch calibration with a second base station and a third base station, the base station can acquire a usable calibration coefficient regardless of whether a counterpart of CoMP transmission is the second base station or the third base station.

However, it is difficult to perform branch calibration in collaboration with all base stations which can perform CoMP transmission together. One reason is that in order to perform branch calibration in a collaborative manner, a reference branch which can communicate with all base stations is necessary, but no reference branch may be present depending on an arrangement relation of each base station.

In this regard, the present invention is made in light of the above-mentioned problems, and it is an object of the present invention to provide a base station, a communication system, and a communication method, which are novel and improved, and which are capable of using a calibration coefficient that differs according to a combination of other base stations that perform CoMP transmission together.

Solution to Problem

In order to solve the above-mentioned problems, according to an aspect of the present invention, there is provided a base station including a plurality of branches, a storage unit that stores a calibration coefficient of each of the plurality of branches for each combination of other base stations, and a multiplying unit that multiplies a transmission signal from each of the plurality of branches by a calibration coefficient corresponding to a combination of one or more other base stations when CoMP transmission with the one or more other base stations is performed through the plurality of branches.

The storage unit may further store a combination of the other base stations performing CoMP transmission with the plurality of branches for each communication device of a CoMP transmission destination, the base station may further include a reading unit that reads a calibration coefficient of each of the plurality of branches corresponding to a combination of other corresponding base stations based on the combination of the other base stations corresponding to a communication device assigned to each resource block, and the multiplying unit multiplies a transmission signal from each of the plurality of branches in each resource block by the calibration coefficient read by the reading unit.

The calibration coefficient of each of the plurality of branches for each combination of other base stations may be a coefficient obtained by performing branch calibration between a plurality of branches of the other base stations and the plurality of branches of the base station based on the same branch.

Further, in order to solve the above-mentioned problems, according to an aspect of the present invention, there is provided a communication system including a plurality of base stations, each of the plurality of base stations including a plurality of branches, a storage unit that stores a calibration coefficient of each of the plurality of branches for each combination of other base stations; and a multiplying unit that multiplies a transmission signal from each of the plurality of branches by a calibration coefficient corresponding to a combination of one or more other base stations when CoMP transmission with the one or more other base stations is performed through the plurality of branches.

Further, in order to solve the above-mentioned problems, according to an aspect of the present invention, there is provided a communication method including multiplying, by a base station that includes a plurality of branches and stores a calibration coefficient of each of the plurality of branches for each combination of other base stations, a transmission signal from each of the plurality of branches by a calibration coefficient corresponding to a combination of one or more other base stations when CoMP transmission with the one or more other base stations is performed through the plurality of branches.

Advantageous Effects of Invention

As described above, according to the present invention, it is possible to use a calibration coefficient that differs according to a combination of other base stations that perform CoMP transmission together.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, in this specification and the drawings, a plurality of elements having substantially the same function and structure may be distinguished from each other with different letter suffixed to the same reference signal. For example, a plurality of elements having substantially the same function and structure are distinguished from each other such as base stations 10A, 10B and 10C as necessary. However, when it is unnecessary to individually distinguish a plurality of elements having substantially the same function and structure, only the same reference signal is attached. For example, when it is unnecessary to particularly distinguish base stations 10A, 10B, and 10C, it is referred to simply as a base station 10.

Further, an "embodiment for embodying the invention" will be described in the following order.

1. Overall Configuration of Communication System
2. Individual Branch Calibration
3. Configuration of Base Station
4. Operation of Base Station
5. Conclusion 1. Overall Configuration of Communication System First, an overall configuration of a communication system 1 according to an embodiment of the present invention will be described with reference to FIG. 1.

Figure 1:
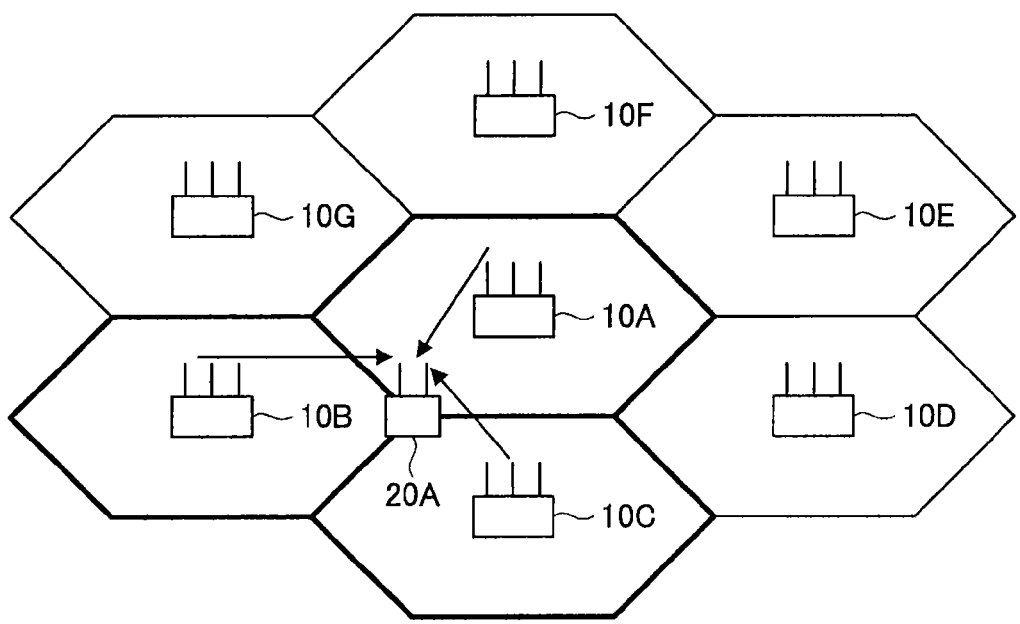
FIG. 1 is an explanatory view illustrating a configuration of a communication system 1 according to an embodiment of the present invention.

FIG. 1 is an explanatory view illustrating a configuration of the communication system 1 according to an embodiment of the present invention. As illustrated in FIG. 1, the communication system 1 according to an embodiment of the present invention includes a plurality of base stations 10 and a communication terminal 20.

The communication terminal 20 (UE: User Equipment) performs communication with the base station 10 under control of the base station 10. For example, the communication terminal 20 performs a reception process in a downlink resource block assigned by the base station 10, and performs a transmission process in an uplink resource block.

The communication terminal 20 may be an information processing device such as a personal computer (PC), a video processing device for home use (a DVD recorder, a videocassette recorder, and the like), a personal digital assistant (PDA), a game machine for home use, or a household electrical appliance. Further, the communication terminal 20 may be a mobile communication device such as a portable telephone, a personal handyphone system (PHS), a portable music reproducing device, a portable video processing device, or a portable game machine.

The base station 10 performs communication with the communication terminal 20 located within its coverage. For example, a base station 10A can perform communication with a communication terminal 20A located within the coverage of the base station 10A. In this disclosure, the description will proceed under the assumption that the base station 10 is a macro cell base station (eNodeB), but the base station 10 is not limited to the macro cell base station. For example, the base station 10 may be a pico cell/micro cell base station which is smaller in maximum transmission power than a macro cell base station or may be a relay node or a femto cell base station.

Each base station 10 is connected in a wired manner, and can exchange information with another base station 10 through wired communication. The base station 10 can implement CoMP which is expected as a next generation technology based on this information exchange. CoMP is classified roughly into joint processing, and coordinated scheduling and/or beamforming.

The joint processing of the former is a technique by which a plurality of base stations 10 simultaneously perform data communication with one communication terminal 20. An example in which the base station 10A, the base station 10B, and the base station 10C simultaneously transmit data to the communication terminal 20A as illustrated in FIG. 1 corresponds to the joint processing. According to the joint processing, branches (antennas and analog circuits) of a plurality of base stations 10 can be used for data communication, and the antenna gain and the SINR can be improved.

Further, when downlink joint processing is performed, it is necessary to distribute transmission data to be directed to the communication terminal 20 to a plurality of base stations 10 in advance using a wired communication path, called, for example, a backhaul, between the base stations 10. Further, uplink joint processing is performed by aggregating data which a plurality of base stations 10 have received from the communication terminal 20.

For example, a method of aggregating data at a bit level after decoding by each base station 10, a method of aggregating data at a soft bit stage before decoding by each base station 10, or a method of aggregating data before de-mapping by each base station 10 may be used as a data aggregation method. As an amount of aggregated data increases after a subsequent demodulation process is performed by each base station 10, an amount of data exchanged through a backhaul increases, but a performance tends to be improved.

The coordinated scheduling and/or beam forming of the latter is a technique by which data transmission is performed only by the one base station 10, and scheduling (control of deciding a resource block to be assigned to each communication terminal 20) is performed based on collaboration of a plurality of base stations 10. According to the coordinated scheduling and/or beam forming, interference between a plurality of base stations 10 can be easily avoided by scheduling adjustment.

The present invention is focused particularly on the joint processing of the former among the two types of CoMPs described above. The joint processing is classified roughly into non-coferent joint processing and coferent joint processing.

The coferent joint processing is a method in which a transmission timing of data from each base station 10 is adjusted such that phases of pieces of data arriving at the communication terminal 20 from the base station 10 match each other. On the other hand, the non-coferent joint processing is a method in which each base station 10 transmits data without adjusting a transmission timing of data from each base station 10. Thus, the coferent joint processing is higher in performance than the non-coferent joint processing. However, in order to perform the coferent joint processing, it is necessary to calculate an adjustment amount of a transmission timing of each base station 10 for each communication terminal 20, and thus there is a disadvantage that processing becomes complicated.

In this regard, it is effective to perform collaborative branch calibration through all branches in the plurality of base stations 10 performing CoMP (which represents the joint processing; the same hereinafter) transmission. This is because, when collaborative branch calibration is performed, all branches in the plurality of base stations 10 are treated equivalently to a plurality of branches in one device in which branch calibration has been completed. Here, when such treatment can be made, it is possible to match uplink directivity with downlink directivity when the branches of the plurality of base stations 10 are used in an aggregate manner, and thus it is unnecessary to adjust a transmission timing of each base station 10 for each communication terminal 20.

Figure 2:
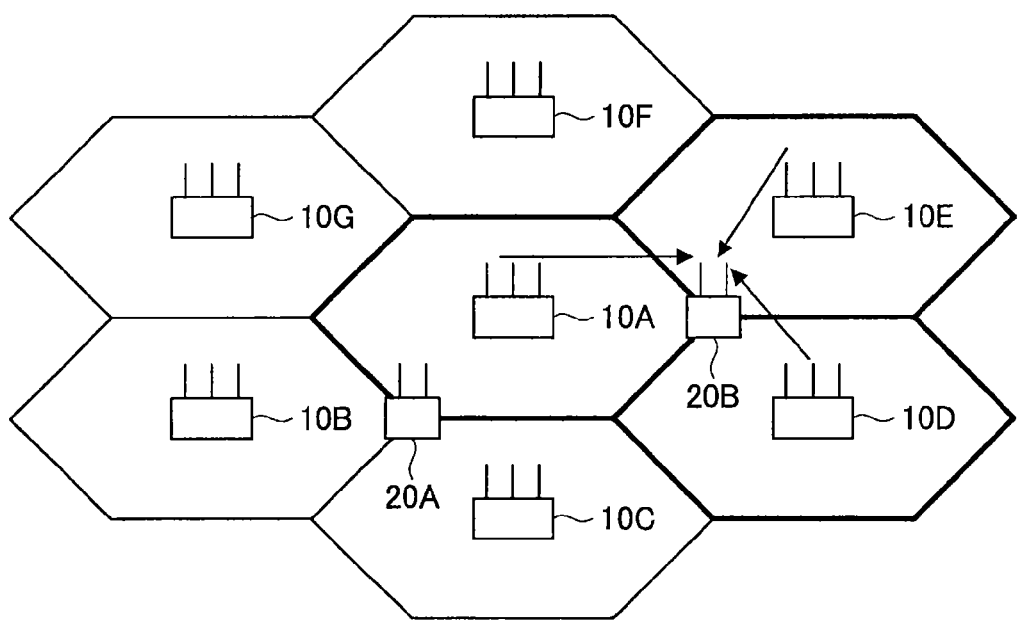
FIG. 2 is an explanatory diagram illustrating an example of a combination of base stations performing CoMP transmission

Here, a combination of other base stations with which a certain base station 10 performs CoMP transmission together is considered to differ according to the position or a communication environment of the communication terminal 20 of a reception destination. For example, when the base station 10A performs CoMP transmission with the base stations 10B and 10C as illustrated in FIG. 1, the base station 10A may perform CoMP transmission with a base station 10D and a base station 10E as illustrated in FIG. 2.

In this regard, when the base station 10 performs unified branch calibration in collaboration with all other base stations which can perform CoMP transmission together, the base station 10 can acquire a primarily usable calibration coefficient regardless of a combination of other base stations. For example, when the base station 10A performs branch calibration in collaboration with the base stations 10B to 10E, the base station 10A can acquire a usable calibration coefficient regardless of which of the base stations 10B to 10E is a counterpart of CoMP transmission.

However, it is difficult to perform branch calibration in collaboration with all base stations 10 which can perform CoMP transmission together. One reason is that in order to perform branch calibration in a collaboration manner, a reference branch which can communicate with all base stations 10 is necessary, but no reference branch may be present depending on an arrangement relation of each base station 10. For example, in the example illustrated in FIGS. 1 and 2, when there is no reference branch which can communicate with both the base station 10B and the base station 10E, it is difficult for the base stations 10A to 10E to perform branch calibration in collaboration with each other.

In this context, an embodiment of the present disclosure has been made in light of the foregoing. The base station 10 according to an embodiment of the present invention can use a calibration coefficient that differs according to a combination of other base stations that performs CoMP transmission together. In the following, in order to help with understanding of an embodiment of the present invention, general branch calibration will be described, and then a detailed configuration of the base station 10 according to an embodiment of the present invention will be described.

2. Individual Branch Calibration

Next, general branch calibration individually performed by the base station 10 will be described together with a branch configuration of the base station 10.

Figure 3:
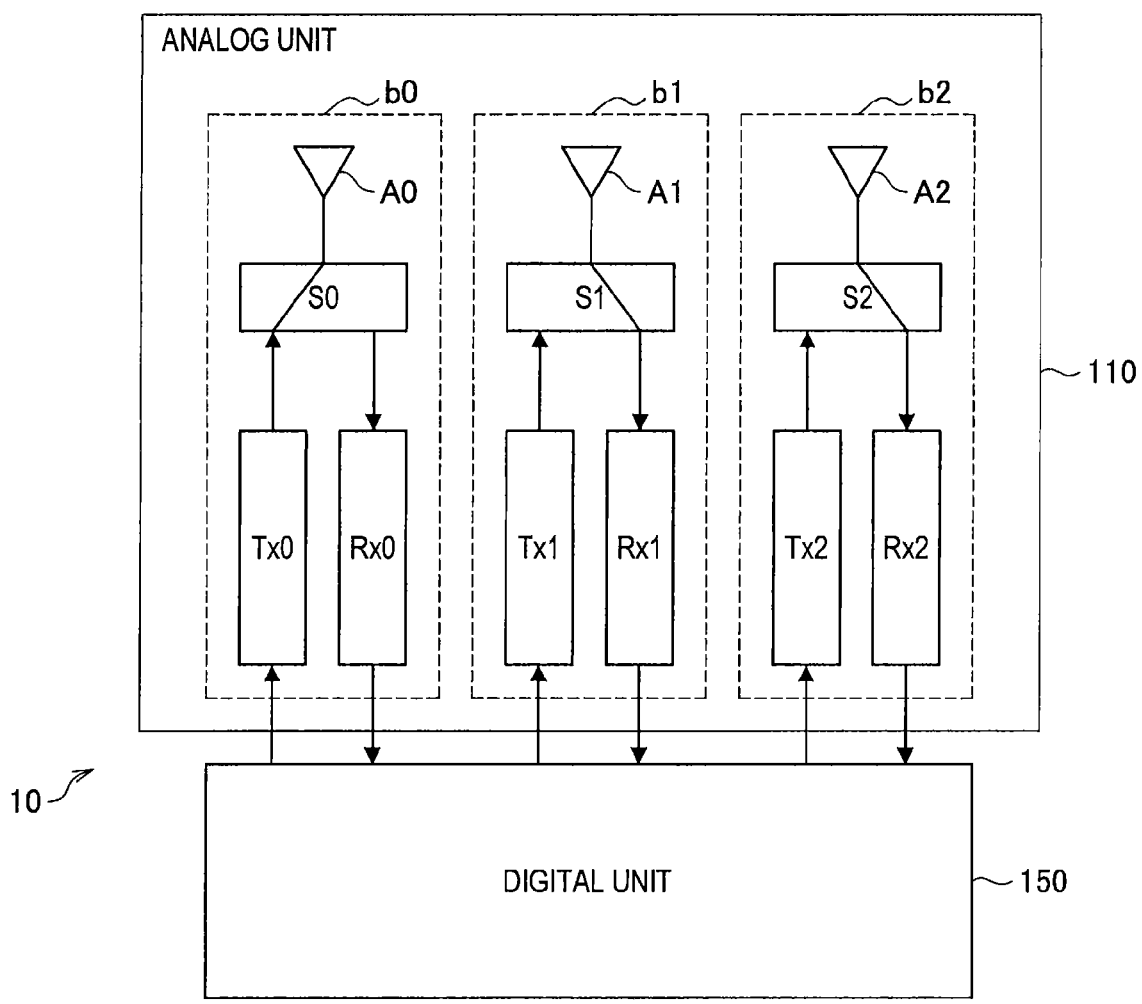
FIG. 3 is an explanatory view illustrating a configuration of a branch of a base station.

FIG. 3 is an explanatory view illustrating a configuration of a branch of the base station 10. As illustrated in FIG. 3, an analog unit 110 of the base station 10 includes a branch b0, a branch b1, and a branch b2. Each branch includes an antenna A, a switch S, a transmission analog unit Tx (which may include a digital-to-analog (DA) converting unit), and a reception analog unit Rx (which may include an analog-to-digital (AD) converting unit). Although FIG. 3 illustrates an example in which the base station 10 includes three branches, the number of branches included in the base station 10 is not limited to three. For example, the number of branches included in the base station 10 may be two or may be four or more.

At the time of transmission, the antenna A configuring each branch is connected to the transmission analog unit Tx through the switch S. The transmission analog unit Tx executes analog processing on a transmission signal supplied from a digital unit 150, and then supplies a high frequency signal which has been subjected to the analog processing to the antenna A. The antenna A converts the high frequency signal supplied from the transmission analog unit Tx into a radio signal, and then transmits the radio signal.

Meanwhile, at the time of reception, the antenna A is connected to the reception analog unit Rx through the switch S. The antenna A converts a received radio signal into a high frequency signal, and then supplies the high frequency signal to the reception analog unit Rx. The reception analog unit Rx executes analog processing on the high frequency signal supplied from the antenna A, and then supplies the reception signal which has been subjected to the analog processing to the digital unit 150.

The antenna A, the transmission analog unit Tx, and the reception analog unit Rx have a transfer function (characteristic) that differs according to a branch. In addition, even inside the same branch, the transfer function of the transmission analog unit Tx differs in phase from the transfer function of the reception analog unit Rx. The problems caused due to the difference between the transfer function of the transmission analog unit Tx and the transfer function of the reception analog unit Rx of each branch in the base station 10 are solved such that the base station 10 individually performs branch calibration. The branch calibration individually performed by the base station 10 will be concretely described below.

Let us assume that a branch number is i, a transfer function of a transmission analog unit Tx of an $i^{th}$ branch is $Tx(i)$, and a transfer function of a reception analog unit Rx of the $i^{th}$ branch is $Rx(i)$. In this case, the branch calibration corresponds to a process of acquiring a calibration coefficient $K(i)$ for each branch satisfying the following Formula 1. In a broad sense, the branch calibration corresponds to a process of complex-multiplying the transmission signal or the reception signal by the calibration coefficient $K(i)$.

$$Tx(0)*K(0)/Rx(0)=Tx(1)*K(1)/Rx(1)=Tx(2)*K(2)/Rx(2) \quad \text{(Formula 1)}$$

Figure 4:
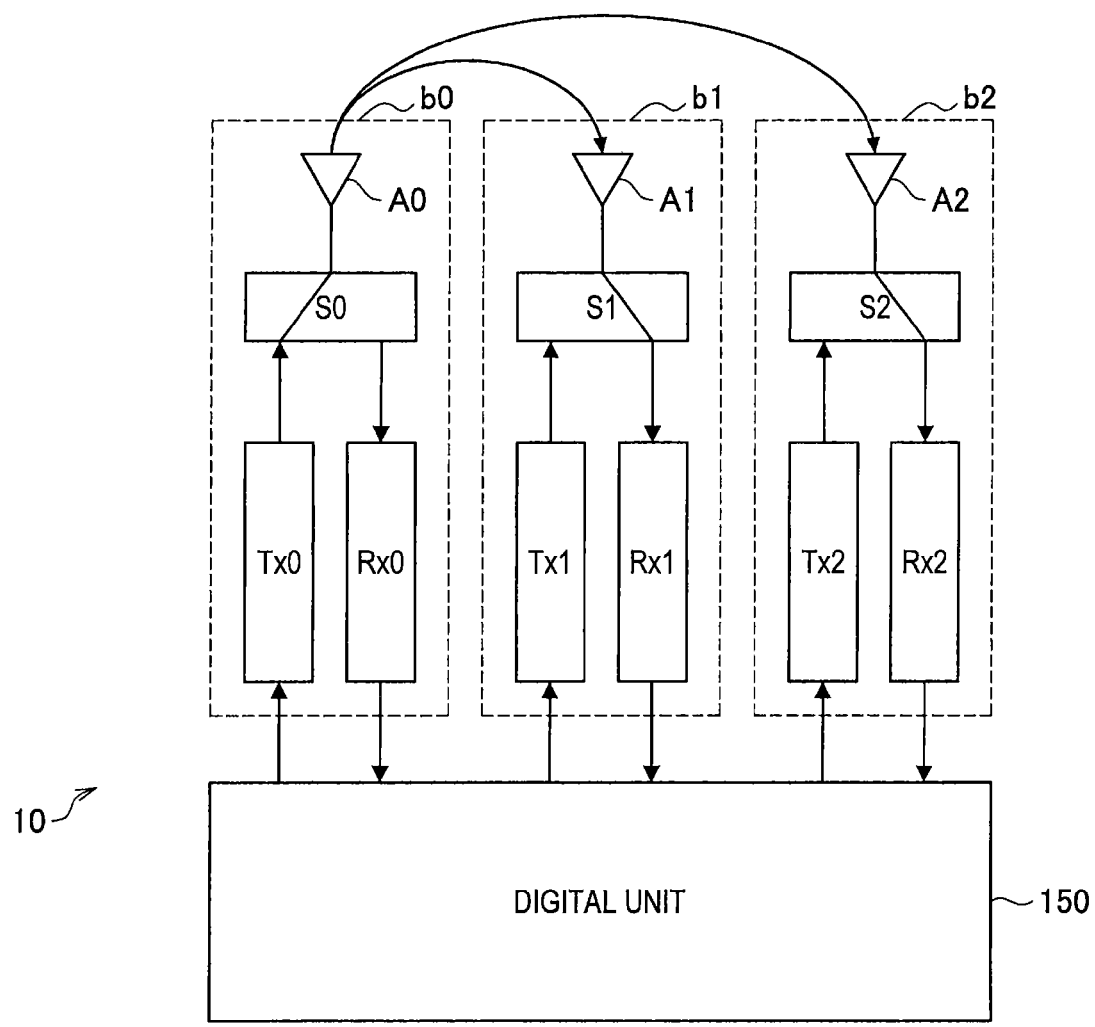
FIG. 4 is an explanatory diagram illustrating a branch calibration process individually performed by a base station.
Figure 5:
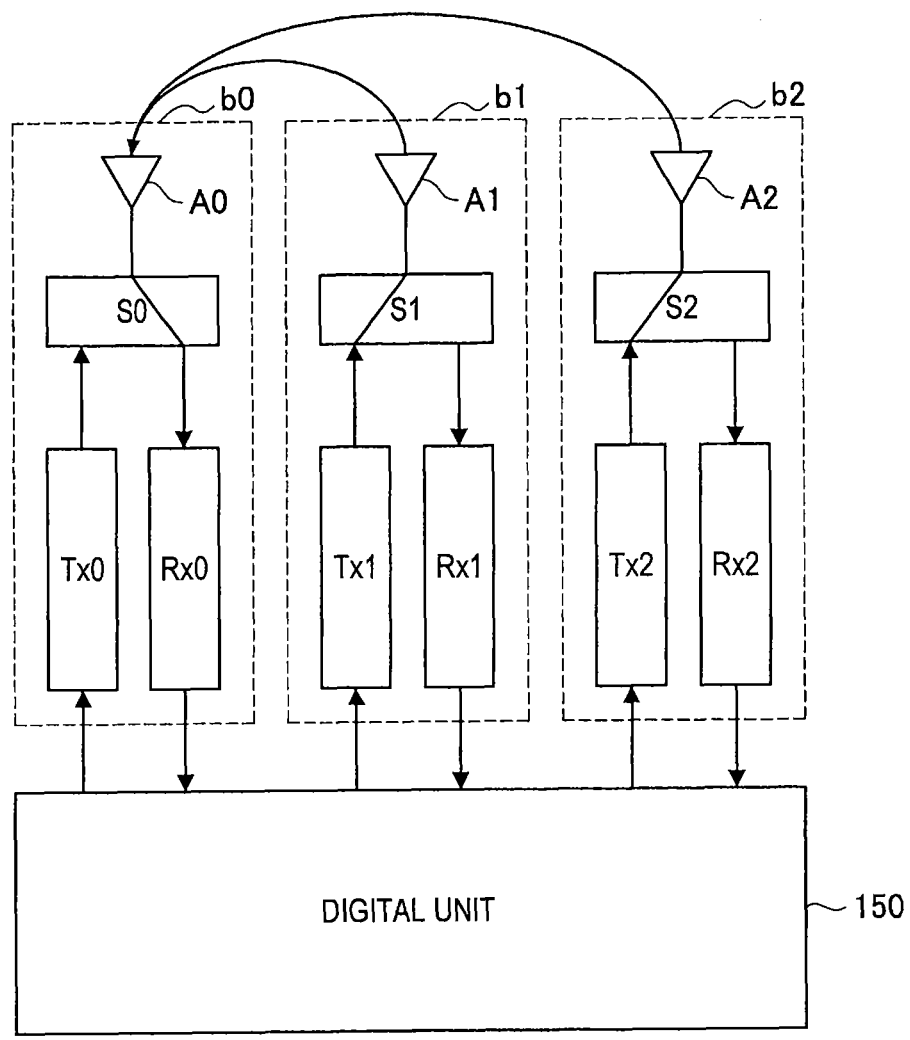
FIG. 5 is an explanatory diagram illustrating a branch calibration process individually performed by a base station.

In order to acquire the calibration coefficient $K(i)$, first, the branch b0 transmits a radio signal, and the branch b1 and the branch b2 receive the radio signal transmitted from the branch b0 as illustrated in FIG. 4. Next, the branch b1 and the branch b2 transmit radio signals, and the branch b0 receives the radio signals transmitted from the branch b1 and the branch b2, as illustrated in FIG. 5.

As a result, the following loop-back transfer function $D(i,j)$ is measured. The loop-back transfer function $D(i,j)$ is a coefficient which is measured from a radio signal which passes through a transmission branch i and a transmission branch j. A branch which transmits a radio signal to a plurality of branches and receives radio signals from a plurality of branches is referred to as a "reference branch."

$$D(0,1)=Tx(0)*Rx(1)$$

$$D(0,2)=Tx(0)*Rx(2)$$

$$D(1,0)=Tx(1)*Rx(0)$$

$$D(2,0)=Tx(2)*Rx(0)$$

The base station 10 can acquire the calibration coefficient $K(i)$ based on the loop-back transfer function $D(i,j)$ according to the following Formula 2.

$$K(0)=1.0$$

$$K(1)=D(0,1)/D(1,0)=\{Rx(1)/Tx(1)\}*\{Tx(0)/Rx(0)\}$$

$$K(2)=D(0,2)/D(2,0)=\{Rx(2)/Tx(2)\}*\{Tx(0)/Rx(0)\} \quad \text{(Formula 2)}$$

Here, when verification of Formula 2 is performed, Formula 1 used as the calibration condition is verified to be satisfied as expressed in the following Formula 3.

$$Tx(0)*K(0)/Rx(0)=Tx(0)/Rx(0)$$

$$Tx(1)*K(1)/Rx(1)=Tx(0)/Rx(0)$$

$$Tx(2)*K(2)/Rx(2)=Tx(0)/Rx(0) \quad \text{(Formula 3)}$$

Further, as expressed in Formula 2, a calibration coefficient $K(0)$ of the $0^{th}$ branch b0 becomes 1.0 because branch calibration has been performed using the branch b0 as the reference branch. Thus, when branch calibration has been performed using the branch b1 as the reference branch, a calibration coefficient $K(1)$ of the $1^{st}$ branch b1 becomes 1.0.

3. Configuration of Base Station

The individual branch calibration has been described so far in order to help with understanding of an embodiment of the present invention. Next, a configuration of the base station 10 according to an embodiment of the present invention will be described in detail with reference to FIG. 6.

Figure 6:
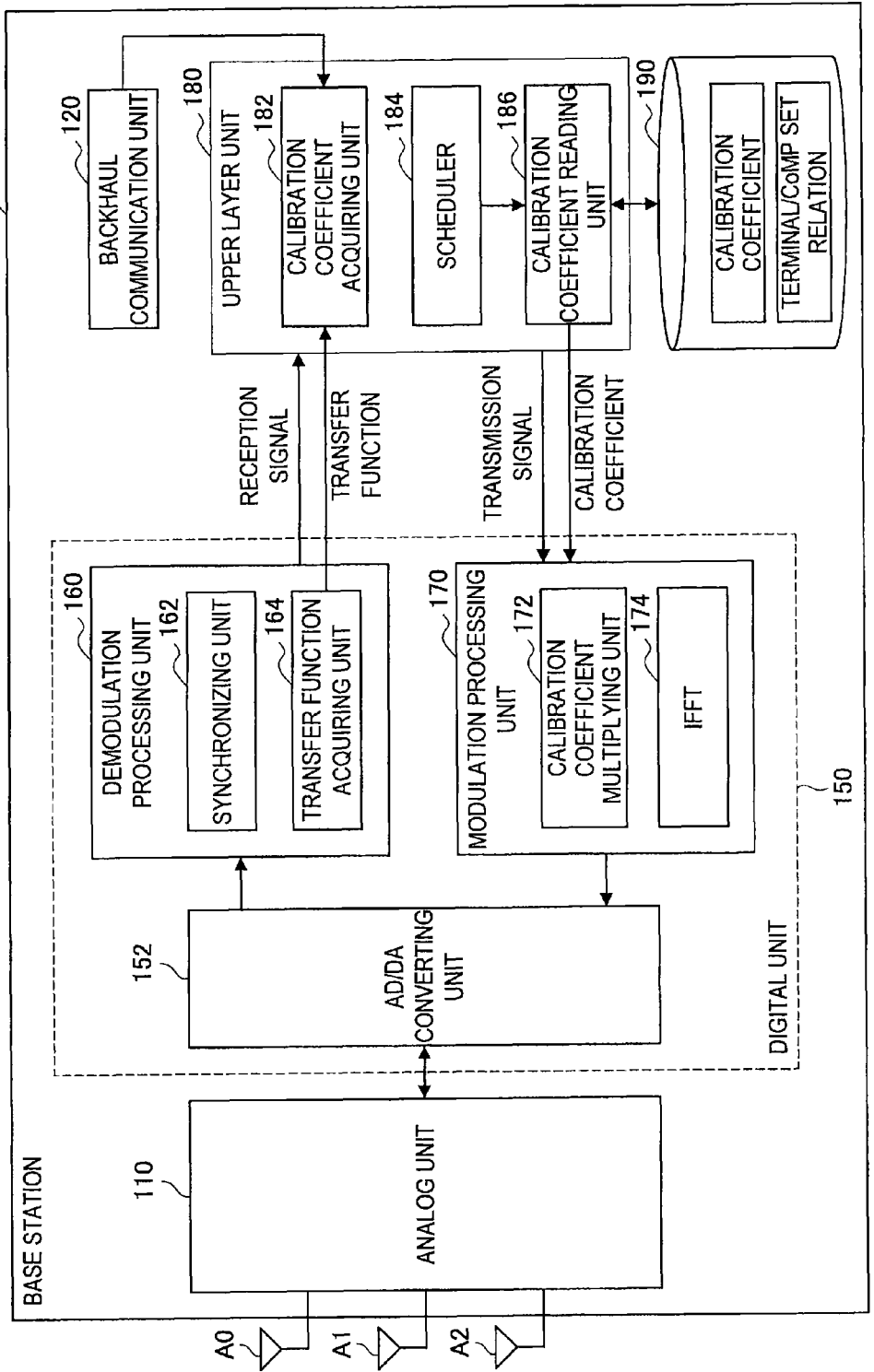
FIG. 6 is a functional block diagram illustrating a configuration of a base station 10 according to an embodiment of the present invention.

FIG. 6 is a functional block diagram illustrating a configuration of the base station 10 according to an embodiment of the present invention. As illustrated in FIG. 6, the base station 10 according to an embodiment of the present invention includes an analog unit 110, a backhaul communication unit 120, a digital unit 150, an upper layer unit 180, and a storage unit 190.

The backhaul communication unit 120 is an interface used to exchange information with another base station through a wired communication path. For example, the base station 10 transmits/receives a loop-back transfer function obtained in the process of collaborative branch calibration which will be described later to/from another base station through the backhaul communication unit 120.

The digital unit 150 includes an AD/DA converting unit 152, a demodulation processing unit 160, and a modulation processing unit 170 as illustrated in FIG. 6. The components of the digital unit 150 may be disposed for each branch.

The AD/DA converting unit 152 converts a reception signal of an analog format supplied from the analog unit 110 into a signal of a digital format, and converts a transmission signal of a digital format supplied from the modulation processing unit 170 into a signal of an analog format.

The demodulation processing unit 160 performs various kinds of processing to demodulate the reception signal supplied from the AD/DA converting unit 152. For example, the demodulation processing unit 160 performs a Fourier transform, de-mapping, error correction, or the like on the reception signal. The demodulation processing unit 160 includes a synchronizing unit 162 and a transfer function acquiring unit 164.

The synchronizing unit 162 acquires synchronization with the reception signal based on a synchronous signal included in the reception signal. The transfer function acquiring unit 164 acquires a loop-back transfer function corresponding to a signal transmission path based on the radio signal received in the process of collaborative branch calibration.

The modulation processing unit 170 performs various kinds of processing to modulate a transmission signal supplied from an upper layer 180. For example, the modulation processing unit 170 performs mapping of a transmission signal, an inverse Fourier transform in an IFFT 174, addition of a guide interval, and the like. A calibration coefficient multiplying unit 172 (multiplying unit) of the modulation processing unit 170 complex-multiplies a transmission signal from each branch by a calibration coefficient of each branch read by a calibration coefficient reading unit 186 in a frequency domain.

The upper layer unit 180 includes a calibration coefficient acquiring unit 182, a scheduler 184, and the calibration coefficient reading unit 186.

(Collaborative Branch Calibration)

The calibration coefficient acquiring unit 182 acquires a calibration coefficient of each branch for each CoMP set which is a combination of other base stations with which the base station 10 performs CoMP transmission together. A method of acquiring a calibration coefficient of each CoMP set is not particularly limited. For example, the calibration coefficient of each CoMP set can be acquired by applying the method described in "2. Individual Branch Calibration." Next, branch calibration to acquire a calibration coefficient for a CoMP set including the base stations 10A to 10C will be described as an example.

Figure 7:
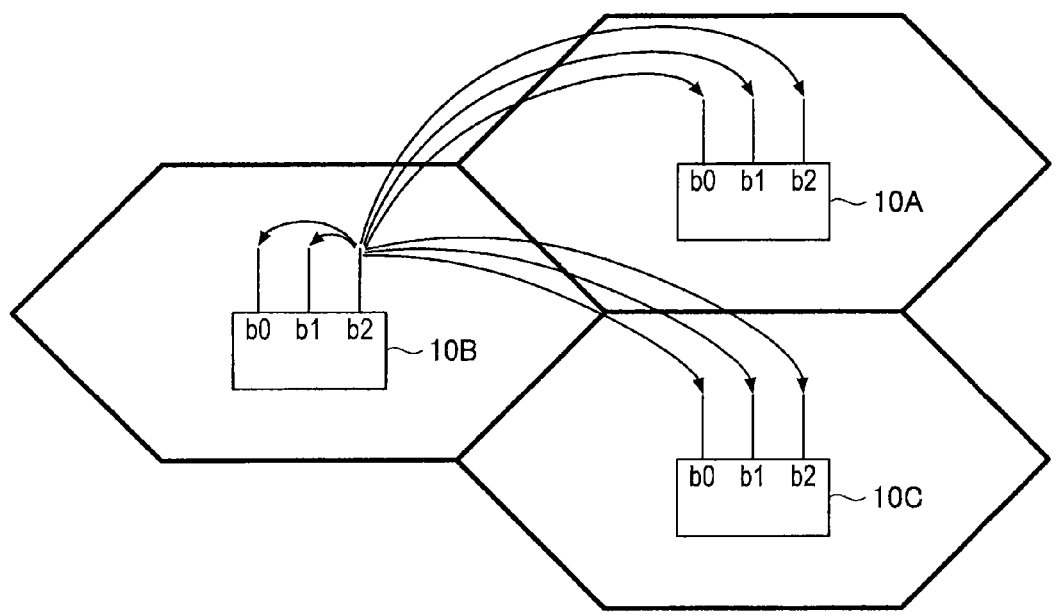
FIG. 7 is an explanatory diagram illustrating a branch calibration process performed by a plurality of base stations in a collaborative manner.

For example, when the branch b2 of the base station 10B is used as the reference branch, as illustrated in FIG. 7, first, the branch b2 of the base station 10B transmits a radio signal, and the branches b0 and b1 of the base station 10B and the branches of the base stations 10A and 10C receive the radio signal. Next, the branches b0 and b1 of the base station 10B and the branches of the base stations 10A and 10C transmit radio signals, and the branch b2 of the base station 10B receives the radio signals. Through this operation, a plurality of loop-back transfer functions (i,j) necessary to calculate the calibration coefficient can be dispersively acquired by the transfer function acquiring units 164 of the base stations 10A to 10C.

Thereafter, the loop-back transfer functions dispersively acquired by the base stations 10A to 10C are aggregated in one base station using backhaul communication. For example, the base station 10B and the base station 10C transmit the acquired loop-back transfer functions to the base station 10A through a backhaul.

Through this operation, the calibration coefficient acquiring unit 182 of the base station 10A can acquire the calibration coefficient of each branch of each base station 10 based on the aggregated loop-back transfer functions. Then, the base station 10A transmits the calibration coefficient of each branch of the base station 10B to the base station 10B, and the calibration coefficient of each branch of the base station 10C to the base station 10C. Further, the base station 10A causes the calibration coefficient of each branch of the base station 10A to be recorded in the storage unit 190.

The method of acquiring the calibration coefficient for the CoMP set through the calibration coefficient acquiring unit 182 has been described so far. The calibration coefficient acquiring unit 182 can acquire a calibration coefficient for another CoMP set by a similar method. The calibration coefficient of each CoMP set acquired by the calibration coefficient acquiring unit 182 is stored in the storage unit 190 as illustrated in FIG. 9.

Figure 9:
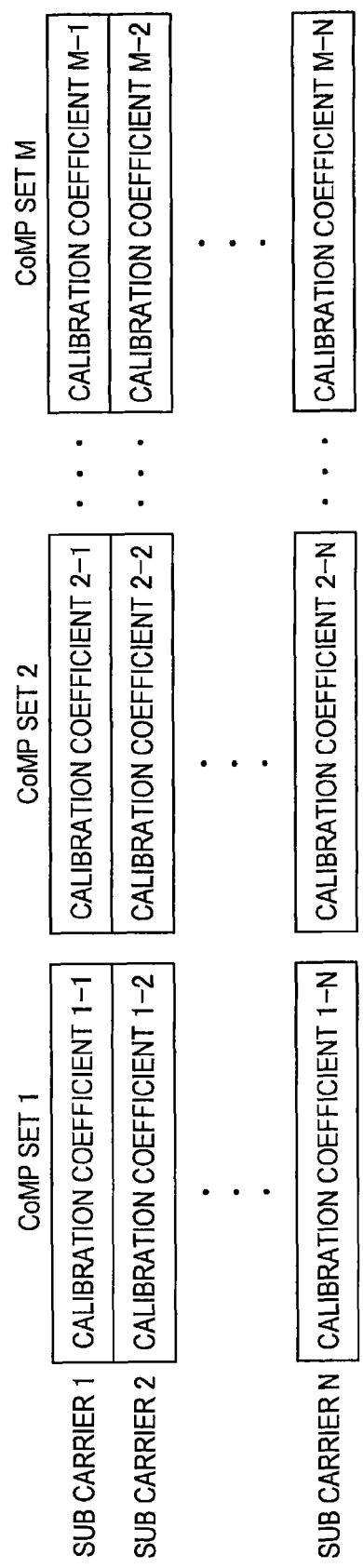
FIG. 9 is an explanatory diagram illustrating a concrete example of a calibration coefficient for each CoMP set stored in a storage unit.

FIG. 9 is an explanatory diagram illustrating a concrete example of the calibration coefficient for each CoMP set stored in the storage unit 190. As illustrated in FIG. 9, the storage unit 190 stores the calibration coefficient of each CoMP set of each branch for each sub carrier.

Figure 10:
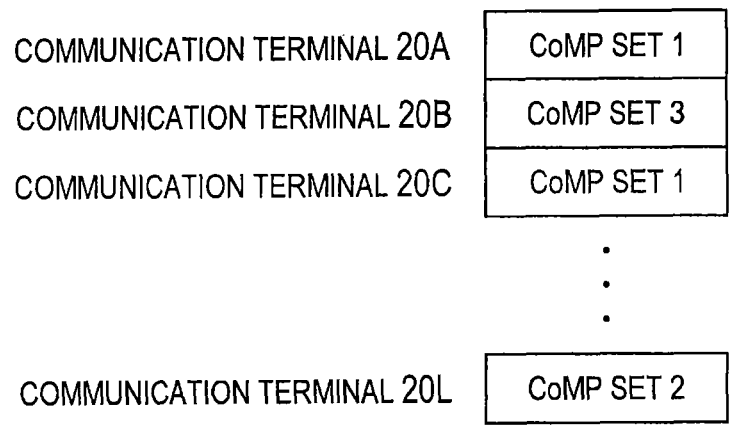
FIG. 10 is an explanatory diagram illustrating a relation between a communication terminal and a CoMP set stored in a storage unit.

The storage unit 190 stores the communication terminal 20 in association with a CoMP set which is determined as being appropriate to the communication terminal 20 by the base station 10 as illustrated in FIG. 10. For example, the CoMP set appropriate to each communication terminal 20 can be determined based on a reception level of a radio signal transmitted from the communication terminal 20 in each base station 10, a positional relation between the communication terminal 20 and each base station 10, or the like.

Figure 8:
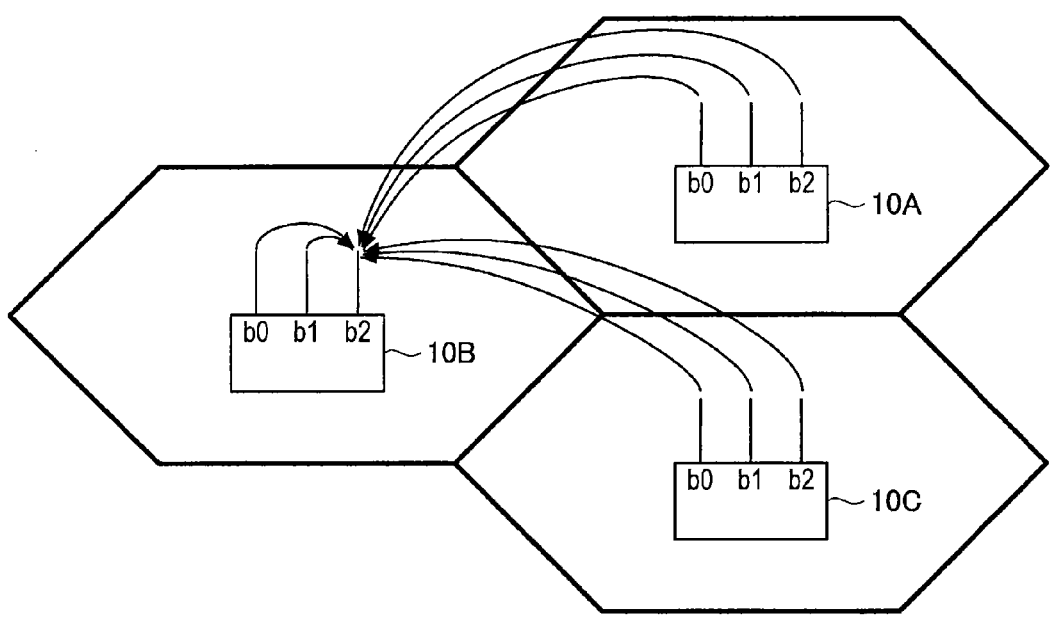
FIG. 8 is an explanatory diagram illustrating a branch calibration process performed by a plurality of base stations in a collaboration manner.

FIGS. 7 and 8 illustrate an example in which branch calibration is performed using a branch in a base station configuring a CoMP set, but the reference branch is not limited to this example. For example, a plurality of base stations 10 configuring a CoMP set may perform branch calibration using a branch of another device such as the communication terminal 20 or a relay node as the reference branch.

(Scheduling)

Referring back to FIG. 6, the description of the configuration of the base station 10 will continue. The scheduler 184 of the base station 10 manages a resource block assigned to each communication terminal 20. One resource block is configured with 12 sub carriers and 7 Ofdm symbols, and the scheduler 184 assigns resources to the communication terminal 20 in units of resource blocks.

Figure 11:
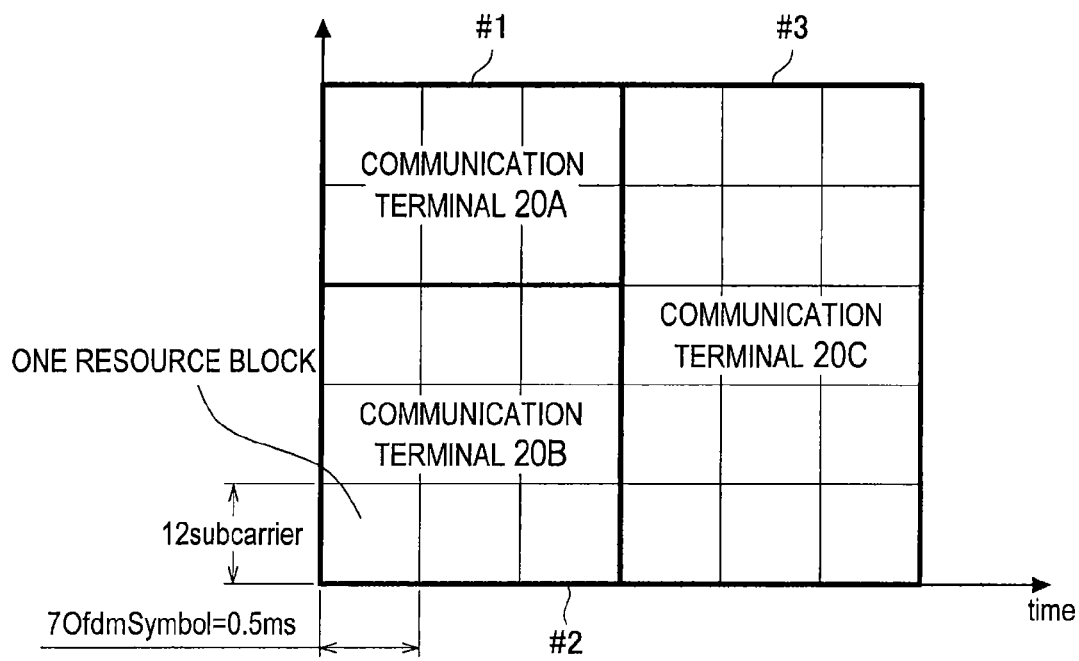
FIG. 11 is an explanatory diagram illustrating a concrete example of scheduling information.

For example, the scheduler 184 may assign a resource block group #1 to the communication terminal 20A, assign a resource block group #2 to the communication terminal 20B, and assign a resource block group #3 to the communication terminal 20C as illustrated in FIG. 11.

(Reading of Calibration Coefficient)

The calibration coefficient reading unit 186 determines a CoMP set which is to perform CoMP transmission in each resource block, and reads a calibration coefficient for the determined CoMP set from the storage unit 190. Then, the calibration coefficient reading unit 186 supplies the calibration coefficient read from the storage unit 190 to the calibration coefficient multiplying unit 172.

Specifically, the calibration coefficient reading unit 186 specifies the communication terminal 20 to which each resource block is assigned based on scheduling information by the scheduler 184. Subsequently, the calibration coefficient reading unit 186 determines a CoMP set corresponding to the specified communication terminal 20 based on a relation between the communication terminal 20 and the CoMP set stored in the storage unit 190. Then, the calibration coefficient reading unit 186 reads a calibration coefficient for the CoMP set corresponding to the specified communication terminal 20 from the storage unit 190, and supplies the calibration coefficient to the calibration coefficient multiplying unit 172.

For example, the calibration coefficient reading unit 186 specifies the communication terminal 20C to which the resource block group #3 is assigned based on scheduling information illustrated in FIG. 11. Subsequently, the calibration coefficient reading unit 186 determines that a CoMP set 1 corresponds to the communication terminal 20C based on the relation between each communication terminal 20 and the CoMP set illustrated in FIG. 10. Then, the calibration coefficient reading unit 186 reads a calibration coefficient for the CoMP set 1 from the storage unit 190. Through this operation, the base station 10 can perform high-performance CoMP transmission to the communication terminal 20C using the calibration coefficient for the CoMP set 1 together with another base station configuring the CoMP set 1.

Figure 12:
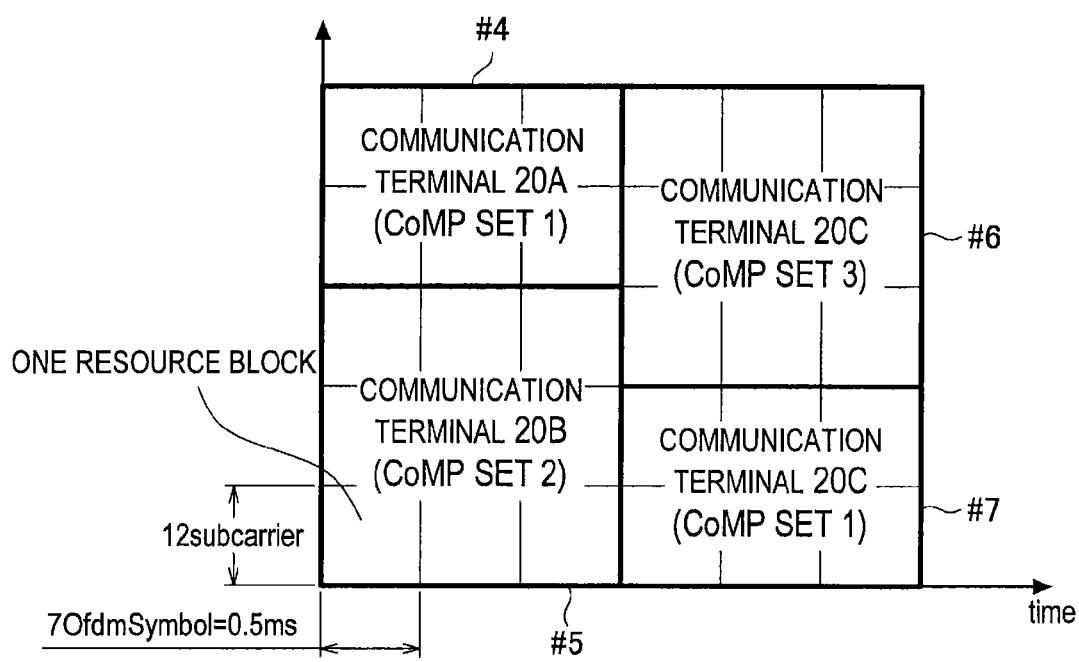
FIG. 12 is an explanatory diagram illustrating a concrete example of scheduling information.

Further, the scheduler 184 may perform an assignment of the CoMP set in addition to an assignment of a resource block to the communication terminal 20. For example, the scheduler 184 may make a setting in which a resource block group #4 is assigned to the communication terminal 20A, and in the resource block group #4, CoMP transmission is performed using the CoMP set 1 as illustrated in FIG. 12.

In this case, preferably, the calibration coefficient reading unit 186 reads the calibration coefficient corresponding to the CoMP set which the scheduler 184 sets in each resource block from the storage unit 190. Like the communication terminal 20C illustrated in FIG. 12, CoMP transmission may be performed using different CoMP sets with respect to the communication terminal 20 of the same transmission destination.

4. Operation of Base Station

The configuration of the base station 10 according to an embodiment of the present invention has been described so far. Next, an operation of the base station 10 according to an embodiment of the present invention will be described with reference to FIG. 13.

Figure 13:
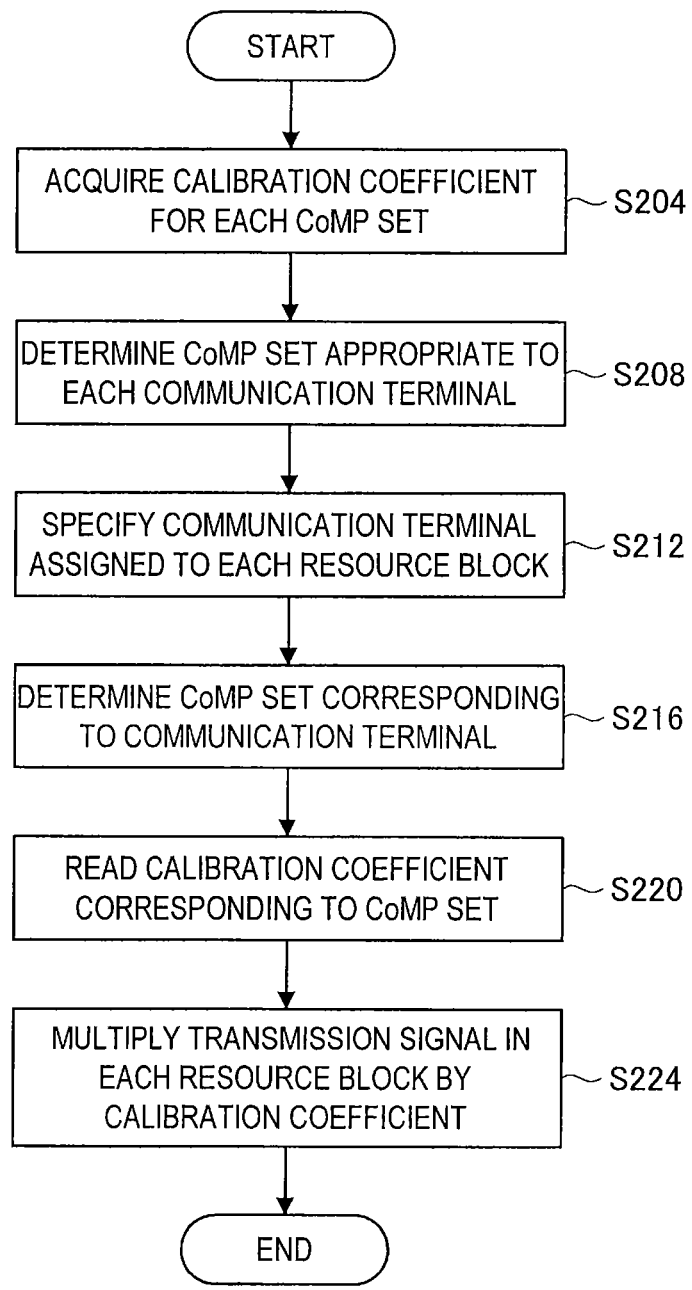
FIG. 13 is a flowchart illustrating an operation of the base station 10 according to an embodiment of the present invention.

FIG. 13 is a flowchart illustrating an operation of the base station 10 according to an embodiment of the present invention. As illustrated in FIG. 13, the base station 10 performs collaborative branch calibration with another base station, acquires the calibration coefficient for each CoMP set, and records the calibration coefficient for each CoMP set in the storage unit 190 (S204).

Further, the base station 10 exchanges information with another base station, determines a CoMP set appropriate to each communication terminal 20, and records a relation between each communication terminal 20 and the CoMP set in the storage unit 190 (S208). For example, the base station 10 may determine one or more base stations whose distance from the communication terminal 20 is a predetermined value or less or one or more base stations in which a reception level of a radio signal transmitted from the communication terminal 20 is a threshold value or more as the CoMP set appropriate to the communication terminal 20.

Subsequently, the calibration coefficient reading unit 186 of the base station 10 specifies the communication terminal 20 assigned to each resource block based on the scheduling information by the scheduler 184 (S212). Then, the calibration coefficient reading unit 186 determines the CoMP set corresponding to the specified communication terminal 20 based on the relation between the communication terminal and the CoMP set stored in the storage unit 190 (S216).

Further, the calibration coefficient reading unit 186 reads the calibration coefficient for the CoMP set corresponding to the specified communication terminal 20 from the storage unit 190, and supplies the read calibration coefficient to the calibration coefficient multiplying unit 172 (S220).

Thereafter, the calibration coefficient multiplying unit 172 complex-multiplies a transmission signal of each branch in each resource block by the calibration coefficient of each branch supplied from the calibration coefficient reading unit 186 (S224). By complex-multiplying by the calibration coefficient, a characteristic difference in a transfer function between the transmission analog unit and the reception analog unit of each branch can be compensated for.

5. Conclusion

As described above, the base station 10 according to an embodiment of the present invention can use a calibration coefficient that differs according to a CoMP set performing CoMP transmission. Further, the base station 10 according to an embodiment of the present invention can perform CoMP transmission through different CoMP sets in a shared channel. As a result, improvement in the throughput of the whole system is expected.

The preferred embodiments of the present invention have been described above in detail with reference to the accompanying drawings, whilst the technical scope of the present disclosure is not limited to the above examples, of course. A person skilled in the art may find various alternations and modifications within the scope of the appended claims, and it should be understood that they will naturally come under the technical scope of the present disclosure.

For example, steps of the processes of the base station 10 of the present disclosure need not necessarily be processed in time series according to an order described as a flowchart. For example, steps of the processes of the base station 10 of the present disclosure may be processed in an order different from an order described as a flowchart or in parallel.

Further, a computer program may be created that causes hardware, which is installed in the base station 10 such as a central processing unit (CPU), a read only memory (ROM), and a random access memory (RAM), to perform functions equivalent to the components of the base station 10. Further, a storage medium storing the computer program is also provided.

REFERENCE SIGNS LIST

10 base station
20 communication terminal
110 analog unit
120 backhaul communication unit
150 digital unit
160 demodulation processing unit
164 transfer function acquiring unit
170 modulation processing unit
172 calibration coefficient multiplying unit
180 upper layer unit
182 calibration coefficient acquiring unit
184 scheduler
186 calibration coefficient reading unit
190 storage unit

The invention claimed is:

1. A base state, comprising:
a plurality of branches; and
circuitry configured to:
  store a calibration coefficient or each of the plurality of branches for each combination with other base stations;
  store a combination of the other base stations performing CoMP transmission with the plurality of branches for each communication device of a CoMP transmission destination;
  read the calibration coefficient of each of the plurality of branches corresponding to a combination of other corresponding base stations based on the combination of the other base stations corresponding to a communication device assigned to a resource block group; and
  multiply a transmission signal from each of the plurality of branches in each resource block group by the read calibration coefficient corresponding to a combination of one or more other base stations when Cooperative Multi-Point (CoMP) transmission with the combination of one or more other base stations is performed through the plurality of branches.

2. The base station according to claim 1, wherein the calibration coefficient of each of the plurality of branches for each combination of the other base stations is a coefficient obtained by performing branch calibration between a plurality of branches of the other base stations and the plurality of branches of the base station based on the same branch.

3. The base station of claim 1, wherein the circuitry is further configured to store at least one CoMP set associated with at least one communication terminal.

4. The base station of claim 3, wherein the association between the at least one CoMP set and the at least one communication terminal is determined based on a reception level of radio signal transmitted from the at least one communication terminal and each base station within the at least one CoMP set.

5. The base station of claim 1, wherein the circuitry is further configured to specify a communication terminal to which at least one resource block is assigned based on a CoMP set associated with the communication terminal.

6. A communication system, comprising:
a plurality of base stations;
each of the plurality of base stations including:
  a plurality of branches, and
  circuitry configured to:
    store a calibration coefficient of each of the plurality of branches for each combination with of base stations;
    store a combination of the one or more other base stations performing CoMP transmission with the plurality of branches for each communication device of a CoMP transmission destination;
    read the calibration coefficient of each of the plurality of branches corresponding to a combination of other corresponding base stations based on the combination of the other base stations corresponding to a communication device assigned to a resource block group; and
    multiply a transmission signal from each of the plurality of branches in each resource block group by the read calibration coefficient corresponding to a combination of one or more other base stations when Cooperative Multi-Point (CoMP) transmission with the combination of one or more otter base stations is performed through the plurality of branches.

7. A communication method, comprising:
in a base station comprising a plurality of branches and circuitry;
  storing a combination of other base stations performing CoMP transmission with the plurality of branches for each communication device of a CoMP transmission destination;
  reading a calibration coefficient of each of the plurality of branches corresponding to a combination of other corresponding base stations based on the combination of the other base stations corresponding to a communication device assigned to a resource block grow; and
  multiplying, a transmission signal from each of the plurality of branches in each resource block group by the read calibration coefficient corresponding to a combination of one or more other base stations when Cooperative Multi-Point (CoMP) transmission with the combination of one or more other base stations is performed through the plurality of branches.

* * * * *